(12) United States Patent
Beller et al.

(10) Patent No.: US 7,068,358 B2
(45) Date of Patent: Jun. 27, 2006

(54) VISUAL FAULT DETECTION FOR OPTICAL MEASUREMENTS

(75) Inventors: Josef Beller, Tuebingen (DE); Joachim Peerlings, Ehningen (DE)

(73) Assignee: Agilent Technologies, Inc., Palo Alto, CA (US)

(*) Notice: Subject to any disclaimer, the term of this patent is extended or adjusted under 35 U.S.C. 154(b) by 0 days.

(21) Appl. No.: 10/500,973

(22) PCT Filed: Jan. 17, 2002

(86) PCT No.: PCT/EP02/00428

§ 371 (c)(1),
(2), (4) Date: Dec. 6, 2004

(87) PCT Pub. No.: WO03/060457

PCT Pub. Date: Jul. 24, 2003

(65) Prior Publication Data

US 2005/0117147 A1   Jun. 2, 2005

(51) Int. Cl.
*G01N 21/00*   (2006.01)

(52) U.S. Cl. ..................................................... 356/73.1
(58) Field of Classification Search ...................... None
See application file for complete search history.

(56) References Cited

U.S. PATENT DOCUMENTS

| 4,289,398 A | * | 9/1981 | Robichaud | 356/73.1 |
| 5,179,419 A | * | 1/1993 | Palmquist et al. | 356/73.1 |
| 5,331,391 A | | 7/1994 | Bukhshtab | 356/73.1 |
| 5,724,127 A | | 3/1998 | Csipkes et al. | 356/73.1 |

* cited by examiner

*Primary Examiner*—Tu T. Nguyen

(57) ABSTRACT

An optical measuring device for providing a measurement of an optical device under test -DUT- comprises a measuring unit for providing an optical stimulus signal for the DUT and/or receiving a response signal of the DUT, and a visual fault localization unit for visually localizing faults within the DUT or a connection thereto. The measuring unit and the visual fault localization unit are preferably coupled to a signal direction unit, and the signal direction unit is further coupled to a connector representing an interface of the optical measuring device for coupling the DUT thereto.

11 Claims, 1 Drawing Sheet

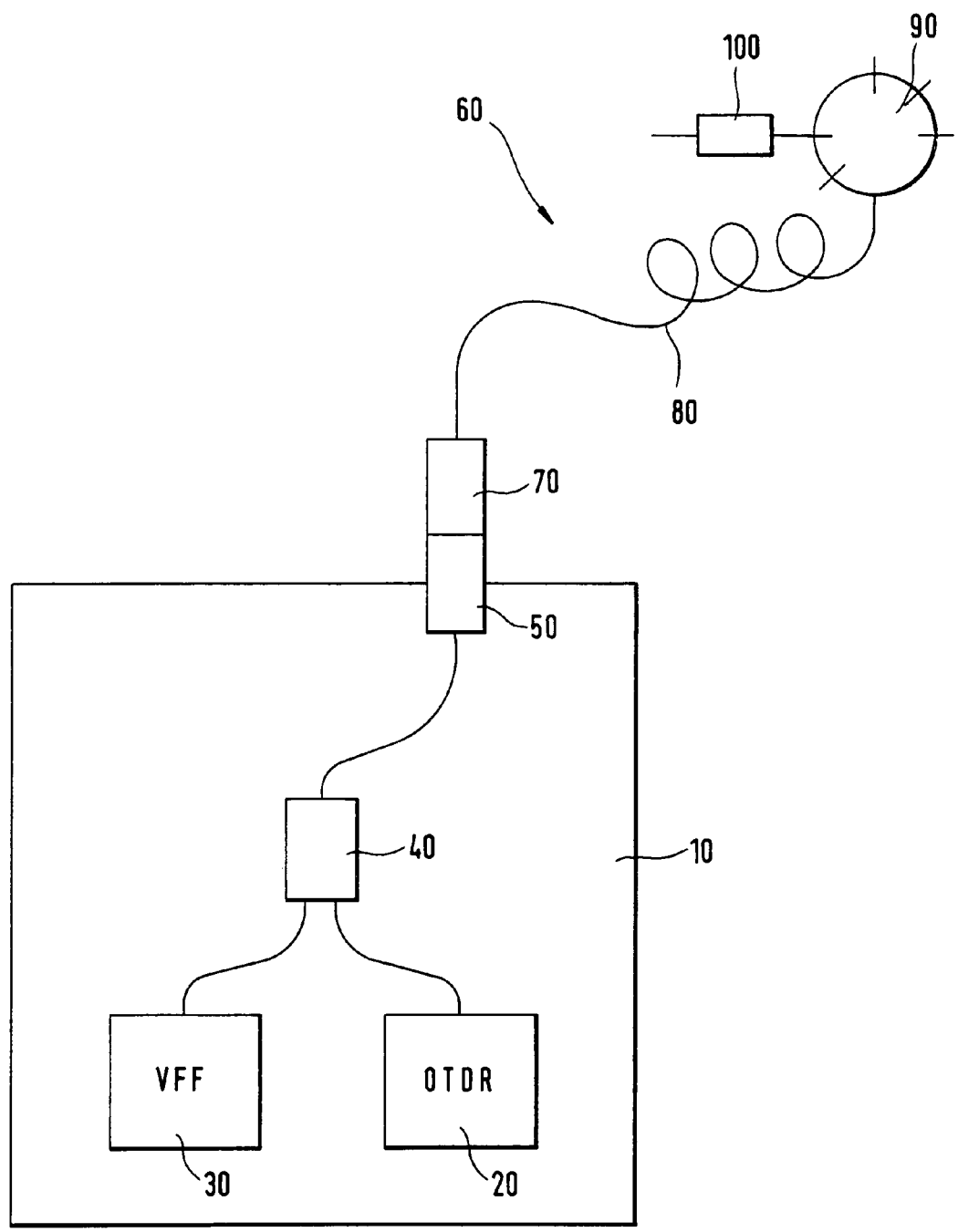

VISUAL FAULT DETECTION FOR OPTICAL MEASUREMENTS

This application is the National Stage of International Application No. PCT/EP02/000428, International Filing Date, Jan. 17, 2002, which designated the United States of America, and which international application was published under PCT Article 21(2) as WO Publication No. WO 03/060457 A1.

BACKGROUND OF THE INVENTION

The present invention relates to optical measurements.

Optical time domain reflectometers (ODTR) are well known in the art and disclosed e.g. in U.S. Pat. No. 6,141,089, EP-A-872 721, or by Dennis Derickson in "Fiber optic test and measurement", ISBN 0-13-534330-5,1998. In such ODTR, an optical stimulus signal with defined measuring wavelength is coupled into a fiber optical network, and a reflected and/or backscattered optical response signal is detected. The detected response signal is generally used for further analyses and visual representation.

With such ODTR measurements, faults occurring in the optical network to be measured can be detected even if occurring up to 200 km away from the ODTR.

Determining optical loss in reflected radiation in a fiber-optic light guide is known from U.S. Pat. No. 5,331,391. U.S. Pat. No. 5,724,127 discloses a microscopes for inspecting a fiber end.

SUMMARY OF THE INVENTION

It is an object of the present invention to provide an improved optical measurement. The object is solved by the independent claims. Preferred embodiments are shown by the dependent claims.

According to the present invention, an optical measuring device for providing a measurement of an optical device under test (DUT) comprises a measuring unit for providing an optical stimulus signal for the optical DUT and/or receiving a response signal of the DUT. The response signal can be a signal emitted from the DUT and/or a signal in response to a stimulus signal applied e.g. from the measuring unit or a different unit. The DUT can be a discrete optical component, a fiber, a fiber network with or without discrete optical components, etc.

The optical measuring device further comprises a visual fault localization unit for visually localizing faults within the DUT or a connection (such as a fiber or a connector) thereto. The visual fault localization unit comprises a visual light source, preferably a red light source. Faults, such as fiber breaking, strong fiber bending, connector faults, defective connections, etc., occurring within the range of transmission of the visual light source can be visually detected by visually inspecting for unwanted locations where light emitted from the visual light source exits.

Both the measuring unit and the visual fault localization unit are coupled to a signal direction unit, and the signal direction unit is further coupled to a connector representing the interface of the optical measuring device for coupling the DUT thereto (e.g. directly or via a fiber network).

The signal direction unit provides a signal direction for optical signals received by the measuring device at the connector as well as for optical signals provided by the measuring unit and/or the visual fault localization unit through the connector towards the DUT and/or any optical network connected there between. The signal direction unit can be embodied e.g. as a switch for switching a connection from either one of the visual fault localization unit or the measuring unit to the connector and vice versa. The signal direction unit may also be embodied as a coupling unit, e.g. an optical coupler such as a four port coupler as known in the art.

In a preferred embodiment, the signal direction unit allows both the visual fault localization unit and the measuring unit to couple optical signals to the connector, whereas in return substantially all optical signals received by the measuring device at the connector will be directed to the measuring unit. Thus, it can be ensured e.g. that all received signals can be detected by the measuring unit while signals from the measuring unit as well as from the visual fault localization unit can be applied even concurrently via the connector.

Careful adjustment and selection of the signal direction unit might in particular be recommended in order to reduce impacts on the measuring dynamic caused by the signal direction unit. This is in particular useful for ODTR measurements.

The invention thus allows to provide the measurement of the measuring unit as well as a visual fault localization provided by the visual fault localization unit of the DUT and/or the optical network coupled to the connector without requiring to change connection. This allows an in-situ verification of the measurement setup, e.g. for verifying connections provided for example by coupled connectors, or for directly detecting faults in the transmission path within reach of the visual fault localization unit. Defective coupling or connectors can thus be detected in-situ for the very same measurement setup as used for executing the measurements of the measuring unit. This significantly improves security and reliability of the measurement, and countermeasures for removing or repairing defects can immediately be initiated.

The invention has been found in particular useful for ODTR measurements—generally requiring lengthy measuring times—by providing the ability of directly verifying fiber connections and the fiber network within reach of the visual fault localization unit even during the ODTR measurement provided by the measuring unit. This significantly improves reliability of the measurement and avoids wrong measurements or measurement interpretations caused e.g. by faulty connections, fiber breaks or strong fiber bending.

While the measuring unit preferably is adapted to provide an ODTR measurement, the measuring unit may also be a WDM-tester, a chromatic dispersion tester, a polarization mote dispersion (PMD) tester, a loss (insertion and/or return loss) tester, a multi path interference measurement, or virtually any measurement having a connection.

The invention can be partly or entirely embodied or supported by one or more suitable software programs, which can be stored on or otherwise provided by any kind of data carrier, and which might be executed in or by any suitable data processing unit.

BRIEF DESCRIPTION OF THE DRAWINGS

Other objects and many of the attendant advantages of the present invention will be readily appreciated and become better understood by reference to the following detailed description when considering in connection with the accompanied drawing.

FIG. 1 illustrates a preferred embodiment according to the present invention.

DETAILED DESCRIPTION OF THE INVENTION

In FIG. 1, a measuring device 10 comprises a measuring unit 20 substantially representing an ODTR unit as known in the art such as an Agilent™ E6000C provided by the applicant Agilent Technologies. The measuring device 10 further comprises a visual fault localization unit 30, which might be embodied as a visual fault finder (VFF), as known in the art.

The measuring unit 20 as well as the visual fault localization unit 30 is coupled through a signal direction unit 40 to a connector 50. The connector 50 represents an interface of the measuring device 10 towards an optical network 60 to be measured. In the example of FIG. 1, the optical network 60 is coupled via a connector 70 to the connector 50 of the measuring device 10 and further comprises a fiber connection 80 and a fiber network 90 with or without discreet optical components 100 coupled thereto.

In operation for testing the optical network 60, the ODTR 20 provides a stimulus signal via the signal direction unit 40 and the connector 50 to the optical network 60 and receives—in return to the provided stimulus signal—a response signal reflected and/or backscattered within the optical network 60. The response signal received at the connector 50 will be directed by the signal direction unit 40 to the ODTR 20 for detecting and analyzing the response signal.

For verifying a correct connection, e.g. of the two connectors 50 and 70, and for detecting faults in the optical network 60 within closer proximity to the measuring device 10, the VFF 30 emits a visually detectable signal through the signal direction unit 40 and the connector 50 towards the optical network 60. Preferably the VFF 30 uses a red light source, such as an Agilent™ E6007A provided by the applicant Agilent Technologies. Visually inspecting the optical network 60 in the closer proximity of the measuring device 10, i.e. within the transmission range of the light source of the VFF 30, for light exiting the optical network 60 and resulting from the light source of the VFF 30 indicates a fault e.g. a fiber break, strong fiber bending, or a defective connection for example between the connectors 50 and 70.

While the visual fault localization provided by the VFF 30 can be executed before or after measurement provided by the ODTR 20, such visual fault localization might even be applied concurrently with the measurement of the ODTR 20. In the latter case, however, it has to be ensured that the signal direction unit 40 routes substantially all of the received response signals towards the ODTR 20. Employing adequate couplers for the signal direction unit 40 can ensure this. However, in order to achieve higher dynamic of the ODTR measurement, switching devices might be applied in the signal direction unit 40 for avoiding response signals coupled to the VFF 30.

The invention claimed is:

1. An optical measuring device for providing a measurement of an optical device under test -DUT-comprising:
    a measuring unit adapted for providing an optical stimulus signal for the DUT and receiving a response signal of the DUT, and
    a visual fault localization unit adapted for transmitting a visual light into the DUT that will emit from fault locations within the DUT or a connection thereto, for visually localizing faults.

2. The optical measuring device of claim 1, wherein the measuring unit and the visual fault localization unit are coupled to a signal direction unit, and the signal direction unit is further coupled to a connector representing an interface of the optical measuring device for coupling the DUT thereto.

3. (Previously Presented) The optical measuring device of claim 2, wherein the signal direction unit is adapted to provide a signal direction for optical signals received by the measuring device at the connector.

4. The optical measuring device of claim 2, wherein the signal direction unit is adapted to provide a signal direction for optical signals provided by the measuring unit or the visual fault localization unit through the connector towards the DUT or any optical network connected therebetween.

5. The optical measuring device of claim 2, wherein the signal direction unit comprises at least one of a switch or a coupling unit.

6. The optical measuring device of claim 2, wherein the signal direction unit is provided to allow both the visual fault localization unit and the measuring unit to couple optical signals to the connector, and to direct substantially all optical signals received by the measuring device at the connector to the measuring unit.

7. The optical measuring device of claim 1, wherein the visual fault localization unit comprises a visual light source.

8. The optical measuring device of claim 1, wherein the response signal is at least one of a signal emitted from the DUT or a signal of the DUT in response to an applied stimulus signal.

9. The optical measuring device of claim 1, wherein the DUT comprises at least one of a discrete optical component, a fiber, or a fiber network with or without discrete optical components.

10. The optical measuring device of claim 1 being one of a time domain reflectometer, a WDM-tester, a chromatic dispersion tester, a polarization mote dispersion (PMD) tester, a loss tester, a multipath interference tester.

11. The optical measuring device of claim 1, wherein the visual fault localization unit comprises a red light source.

* * * * *

UNITED STATES PATENT AND TRADEMARK OFFICE
CERTIFICATE OF CORRECTION

| | | |
|---|---|---|
| PATENT NO. | : 7,068,358 B2 | Page 1 of 1 |
| APPLICATION NO. | : 10/500973 | |
| DATED | : June 27, 2006 | |
| INVENTOR(S) | : Beller et al. | |

It is certified that error appears in the above-identified patent and that said Letters Patent is hereby corrected as shown below:

In Column 4, line 18, claim 3, delete "(Previously Presented)" before "The".

Signed and Sealed this

Thirty-first Day of October, 2006

JON W. DUDAS
*Director of the United States Patent and Trademark Office*